US007028202B2

(12) United States Patent
Long et al.

(10) Patent No.: US 7,028,202 B2
(45) Date of Patent: Apr. 11, 2006

(54) POWER ADAPTER IDENTIFICATION

(75) Inventors: Michael D Long, Portland, OR (US); Daniel C Rudolph, Corvallis, OR (US); James F Bausch, Salem, OR (US); Paul G Massey, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 650 days.

(21) Appl. No.: 10/202,136

(22) Filed: Jul. 24, 2002

(65) Prior Publication Data

US 2004/0018774 A1 Jan. 29, 2004

(51) Int. Cl.
*G06F 1/26* (2006.01)

(52) U.S. Cl. ...................................... 713/340; 713/300

(58) Field of Classification Search ........ 713/300–320, 713/340; 439/488, 491, 517, 620
See application file for complete search history.

(56) References Cited

U.S. PATENT DOCUMENTS

| | | | | |
|---|---|---|---|---|
| 5,297,015 A | | 3/1994 | Miyazaki et al. | |
| 5,384,544 A | | 1/1995 | Flugstad et al. | |
| 5,570,002 A | * | 10/1996 | Castleman | 323/283 |
| 5,593,323 A | * | 1/1997 | Dernehl | 439/668 |
| 6,368,155 B1 | * | 4/2002 | Bassler et al. | 439/620 |
| 6,498,957 B1 | * | 12/2002 | Umetsu | 700/22 |
| 2003/0159073 A1 | * | 8/2003 | Breen et al. | 713/300 |

* cited by examiner

*Primary Examiner*—Dennis M. Butler

(57) ABSTRACT

Apparatus and methods associated with power adapter identification are described. In one embodiment the apparatus includes an adapter plug having at least two contacts and at least one circuit component connected to the at least two contacts.

66 Claims, 7 Drawing Sheets

POWER ADAPTER IDENTIFICATION

BACKGROUND OF THE INVENTIONS

1. Field of the Inventions

The present inventions are generally related to power adapters.

2. Description of the Related Art

Adapters are commonly used to supply power to electronic devices, such as laptop and notebook computers, peripheral devices used in conjunction with laptop and notebook computers, palmtop computers, e-tablets, audio and video recording and playback devices, and many other portable electronic devices. In most instances, adapters convert alternating current ("AC") power from an AC power source, such as a wall outlet, into the direct current ("DC") power that is used by electronic devices. The adapters are also typically separate devices that may be plugged into portable electronic devices as desired.

The respective power requirements of many electronic devices have changed over the years and the power output capacities (or "ratings") of the corresponding adapters have changed accordingly. In the notebook computer context, for example, power requirements have increased over the years from 60 watts, to 75 watts, to 90 watts in recent years, and the ratings of the AC to DC adapters used therewith have increased accordingly.

The inventors herein have determined that conventional adapters and the electronic devices that are powered by the adapters are susceptible to improvement. More specifically, the inventors herein have determined that because adapter plugs are for the most part mechanically similar, users are frequently able to plug underpowered adapters into electronic devices. In the notebook computer context, for example, users may be able to plug a 60 watt adapter into a notebook computer that is capable of drawing 75 watts. Mismatching adapters and electronic devices can be problematic because an underpowered adapter may shut down, sometimes permanently, when an electronic device attempts to draw more than the rated level of power from the adapter.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. It is noted that detailed discussions of adapters and associated electronic devices that are not pertinent to the present inventions have been omitted for the sake of simplicity. The present inventions are also applicable to a wide range of adapters, including those presently being developed or yet to be developed. Additionally, although they are discussed below in the context of a notebook computer and an AC to DC adapter, the present inventions are not so limited. In addition to notebook computers, the present inventions are applicable to electronic devices such as palmtop computers, e-tablets, audio and video recording and playback devices, personal digital assistants, mobile telephones, digital cameras, electronic games, and any other electronic device that may be powered by an adapter. In addition to AC to DC adapters, the present inventions are also applicable to DC to AC adapters, AC to AC adapters, and DC to DC adapters.

Figure 1:
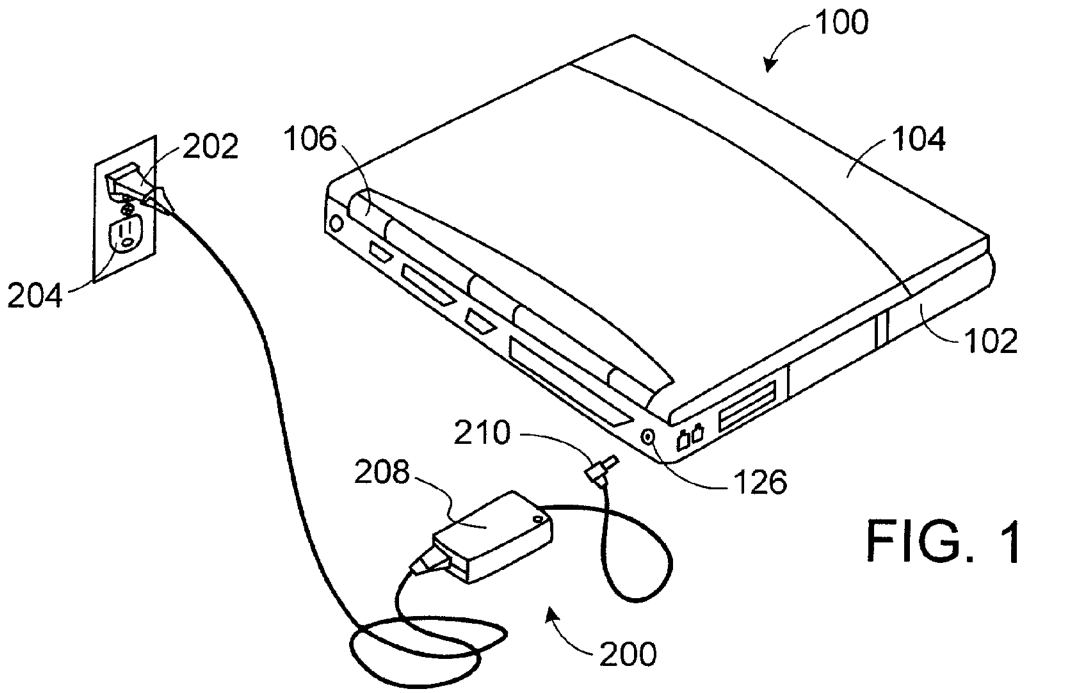
FIG. 1 is a perspective view of an adapter and notebook computer in accordance with one embodiment of a present invention.
Figure 2:
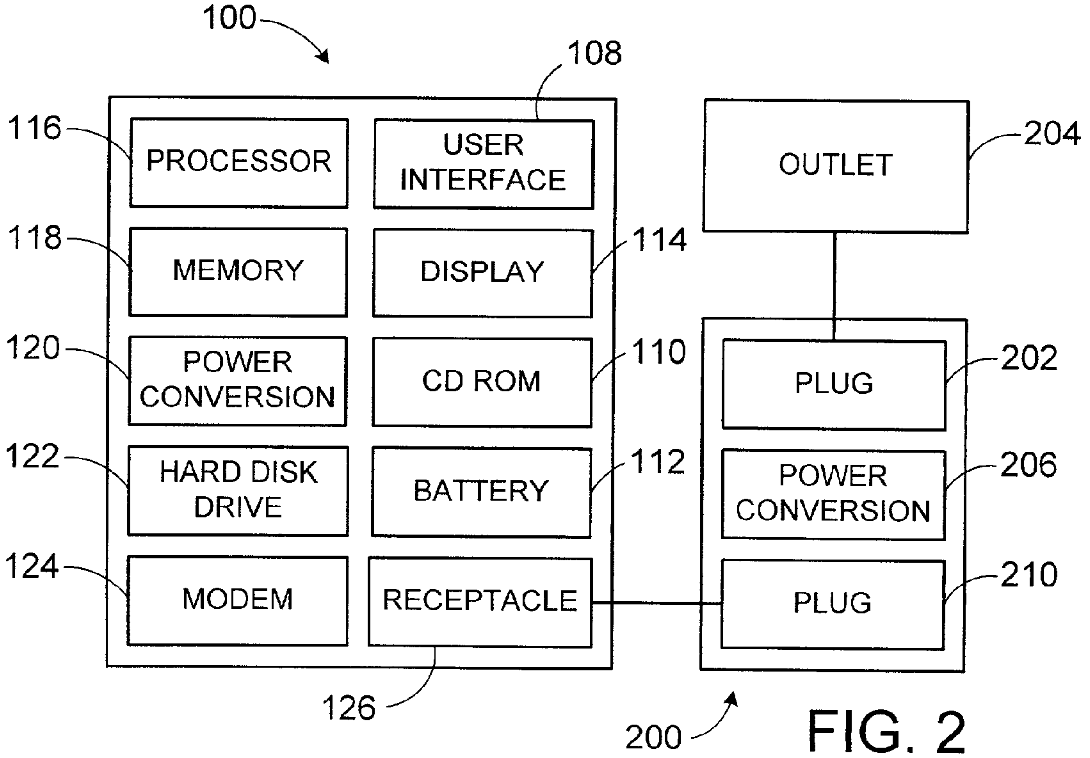
FIG. 2 is a block diagram of the adapter and a notebook computer illustrated in FIG. 1.

As illustrated for example in FIGS. 1 and 2, a system in accordance with one embodiment of a present invention includes a notebook computer 100 and an AC to DC adapter 200. Although the present inventions are not limited to any particular notebook computer, the exemplary notebook computer 100 is, with respect to many of the structural and operating components, substantially similar to conventional portable computers such as the Hewlett-Packard Omnibook 6000 notebook PC. More specifically, the exemplary notebook computer 100 includes structural components such as a main housing 102 and display housing 104 that are pivotably coupled to one another by a hinge 106. The top side of the main housing 102 (see FIG. 13) supports a user interface 108 including a keyboard, a touch pad, and right/left click buttons. Each of these elements operates in conventional fashion to control the operations of the computer 100 and application programs running thereon. The main housing 102 also includes a module bay for optional modules such as the illustrated CD-ROM drive module 110 (of FIG. 2), a 3.5 inch disk drive module, or a ZIP drive module. A bay for battery 112 is also provided. In addition to supporting a display 114, the display housing 104 also acts as a lid to cover the user interface 108 when in the closed position. To that end, a conventional latch arrangement (not shown) may be provided to lock the free end of the display housing 104 to the main housing 102 and maintain the display housing in the closed position.

The operating components of the exemplary notebook computer 100 include a CPU (or "processor") 116, cache and RAM memory 118, a power converter apparatus 120, a hard disk drive 122, a modem 124, and a power receptacle 126 that is described in greater detail below. The exemplary computer 100 may also include other conventional components such as, for example, audio and video cards, headphone and microphone ports, serial, parallel and USB ports, keyboard and mouse ports, an operating system such as Microsoft® Windows, and various application programs such a word processing, spreadsheets, security programs and games.

The exemplary adapter 200 includes a wall outlet plug 202 that may be connected to a wall outlet 204, a power conversion apparatus 206 (e.g. a rectifier, inverter, filter and transformer arrangement) with an input and an output, a housing 208 (FIG. 1) for the power conversion apparatus, and an adapter plug 210 that is configured to mate with the power receptacle 126 on the notebook computer 100. One example of a suitable power conversion apparatus 206 for use with the exemplary computer 100 is the power conversion apparatus found in the Hewlett-Packard model No. F1781 AC to DC adapter.

The exemplary notebook computer 100 (or other adapter powered electronic device) and adapter 200 are preferably configured such that the notebook computer is able to determine the power output rating of the adapter. As a result, the notebook computer 100 can, if necessary, alter its power consumption so that it does not attempt to draw more than the rated level of power. These functions are preferably performed at least in part by the CPU 116, but may also be performed by dedicated processors and/or circuitry. Power consumption may be altered by, for example, altering the level of power being consumed by various power consuming apparatus within the notebook computer (or other electronic device). In the notebook computer context, power consumption may be altered by, for example, altering the CPU operation, battery charging function, hard disk operation and/or display operation.

Preferably, the exemplary notebook computer 100 (or other adapter powered electronic device) determines the power output rating of the exemplary adapter 200 by measuring a value related to a circuit component (e.g. a resistor, inductor, capacitor or transformer) associated with the adapter, or one or more values related to a combination of circuit components associated with the adapter. In other words, depending on the circuit component or combination of circuit components associated with the adapter 200, the notebook computer 100 may be configured to measure one or more of the following circuit component values: resistance, inductance, capacitance, impedance or transformer coupling (sometimes referred to as the "turns ratio" of a transformer). Although various exemplary embodiments are described below in the context of resistors and resistance measurement, the present inventions include any circuit component or circuit component combination and the measurement of the respective values associated therewith.

Figure 3A:
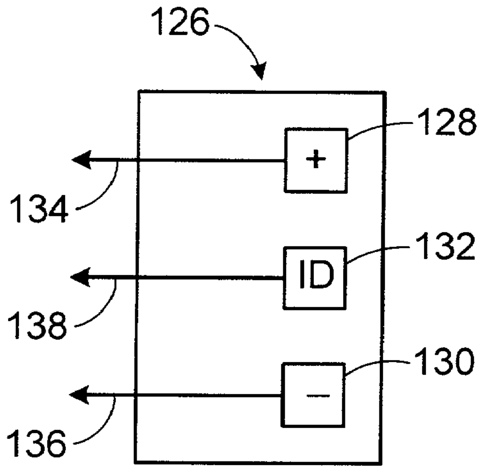
FIG. 3A is a block diagram showing an electronic device receptacle in accordance with one embodiment of a present invention.
Figure 3B:
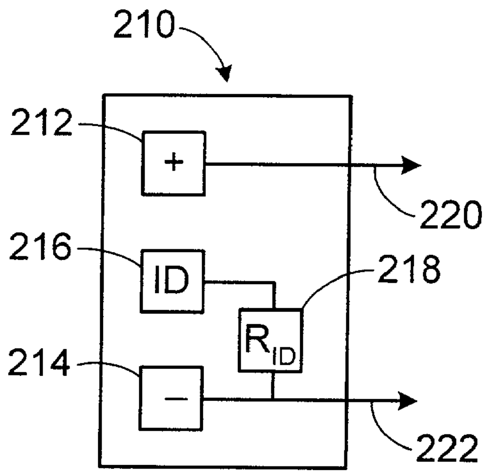
FIG. 3B is a block diagram showing an adapter plug in accordance with one embodiment of a present invention.
Figure 4:
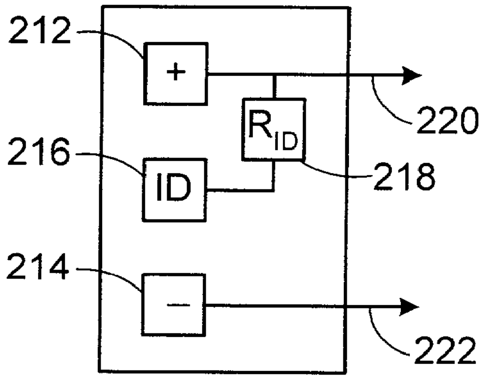
FIG. 4 is a block diagram showing an adapter plug in accordance with one embodiment of a present invention.

As illustrated for example in FIGS. 3A and 3B, the exemplary receptacle 126 and plug 210 each include three electrical contacts. [It should be noted that the terms "plug" and "receptacle" are not being used to limit the inventions to any particular type of power connector physical structure and is instead being used to represent any type of power connector, regardless of physical structure.] More specifically, the notebook power receptacle 126 includes a positive contact 128, a ground contact 130 and an adapter ID contact 132, which are respectively connected to the appropriate circuitry within the notebook computer 100 by wires 134, 136, and 138. Similarly, the adapter plug 210 includes a positive contact 212, a ground contact 214, and an adapter ID contact 216. The adapter plug 210 also includes an adapter ID resistor 218. The positive contact 212 and ground contact 214 are respectively connected to the power conversion apparatus 206 (FIG. 2) by wires 220 and 222. The adapter ID contact 216 is connected to the adapter ID resistor 218, and the ID resistor is in turn connected to the ground wire 222 in the manner illustrated in FIG. 3B. Alternatively, as illustrated in FIG. 4, the adapter ID resistor 218 may be connected to the positive wire 220 in addition to the adapter ID contact 216.

In the illustrated embodiments, the resistance of the adapter ID resistor 218 ("$R_{ID}$") is used to represent the power rating of the adapter 200. The exemplary notebook computer 100 (or other adapter powered device) measures the resistance $R_{ID}$ in order to determine power rating of the adapter 200. The notebook computer 100 may, for example, store a table of resistance $R_{ID}$ values and the adapter power ratings to which the resistance $R_{ID}$ values correspond. Alternatively, an algorithm could be used to calculate adapter power ratings based on the measured resistance $R_{ID}$ value.

In one implementation, a resistance $R_{ID}$ value of 10 kΩ corresponds to a 90-watt adapter, a resistance $R_{ID}$ value of 20 kΩ corresponds to a 75-watt adapter, and a resistance $R_{ID}$ value of 30 kΩ could correspond to a 60-watt adapter. Additionally, the table preferably assigns a power rating to a resistance $R_{ID}$ value of 0 kΩ in order to account for the situation where the exemplary notebook computer 100 is used in conjunction with an adapter having a conventional plug (i.e. a plug with a positive contact and a ground contact, but no ID resistor and ID contact). Here, the ground contact 130 and adapter ID contact 132 of the computer power receptacle 126 are both in contact with the adapter's ground contact and, therefore, the measured resistance would be zero. A pre-selected "safe" adapter rating, such as 60 watts, could be assigned to the resistance $R_{ID}$ value of 0 kΩ.

The exemplary notebook computer 100 (or other adapter powered electronic device) may also be configured to accommodate those instances where the notebook power receptacle 126 and adapter plug 210 are mechanically mismatched due to, for example, use of the notebook computer with an adapter (such as adapter 200) that was not intended for use with the computer. For example, the adapter ID contact 132 may be slightly spaced from adapter ID contact 216 when the power receptacle 126 is connected to a mismatched adapter plug 210. This could, for example, happen when the male portion of a power receptacle is shorter than the corresponding female portion of the adapter plug. The spacing results in the measured resistance $R_{ID}$ value being extremely high or infinite. A pre-selected "safe" adapter rating, such as 60 watts, could also be assigned to this situation.

Figure 5:
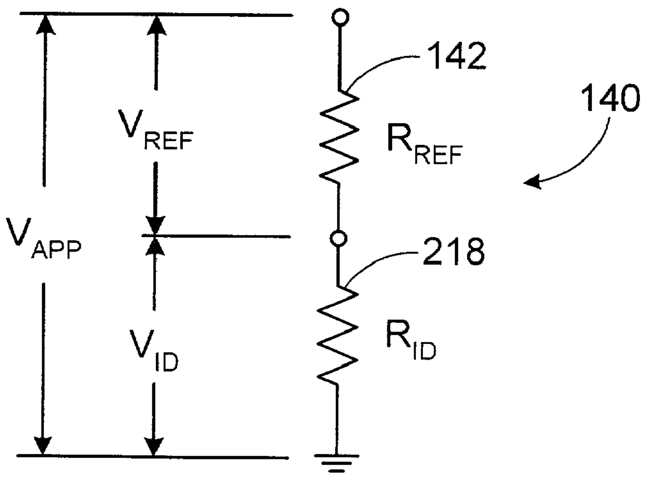
FIG. 5 is a circuit diagram in accordance with one embodiment of a present invention.

The resistance $R_{ID}$ may be measured in any suitable manner. Although the present inventions are not so limited, one example of a circuit used by the notebook computer 100 to measure the resistance $R_{ID}$ is generally represented by reference numeral 140 in FIG. 5. Here, the notebook computer 100 is provided with an internal reference resistor 142, having a resistance $R_{REF}$, in series with the adapter contact 132 and, therefore, in series with the adapter ID resistor 218. The notebook computer 100 applies a known voltage $V_{APP}$ (e.g. 5 V) across the ground and adapter contacts 130 and 132 and measures the voltage $V_{REF}$ across the reference resistor 142. The notebook computer 100 may then calculate the voltage $V_{ID}$ across the adapter ID resistor 218 by subtracting $V_{REF}$ from $V_{APP}$ and can calculate the resistance $R_{ID}$ using the equation $R_{ID}=R_{REF}V_{ID}/(V_{APP}-V_{ID})$.

It should be noted that, as indicated above, other circuit components (such as an inductor, capacitor or transformer), or a combination of circuit components, may be employed in place of the exemplary adapter ID resistor. Here, adapter ID values such as inductance, capacitance, impedance or turns ratio would be measured.

Figure 6:
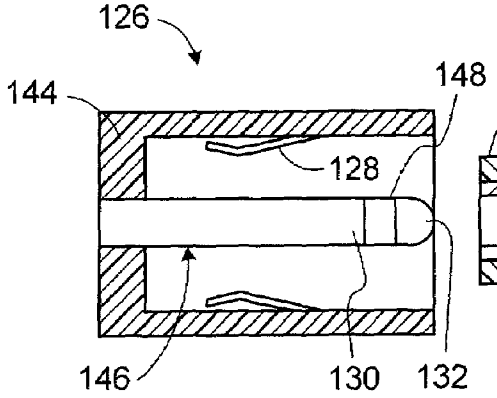
FIG. 6 is a side, partial section view of an electronic device receptacle in accordance with one embodiment of a present invention.

With respect to physical structure, the receptacle 126 and plug 210 may be configured in any fashion that is suitable for their intended use. Exemplary configurations that may be employed in the notebook computer environment are illustrated FIGS. 6 and 7 with the wiring removed for purposes of clarity. Referring first to FIG. 6, one example of a notebook power receptacle 126 includes a housing 144 and a post-like (or "male") connector 146 that is mounted within the housing. One or more positive contacts 128 are positioned on the inner surface of the housing 144, while the ground contact 130 and adapter ID contact 132 are carried by the connector 146 with insulation 148 therebetween. The positive contacts 128 are preferably, although not necessarily, spring-like contacts that deflect when the adapter plug 210 is connected to the notebook power receptacle 126. The ground contact 130 is generally cylindrical and the adapter ID contact 132 includes a generally cylindrical portion and a generally semi-spherical portion. The positive contact 128, ground contact 130 and adapter ID contact 132 are, as noted above, connected to the appropriate circuitry within the notebook computer 100 by wires (not shown in FIG. 6).

Figure 7:
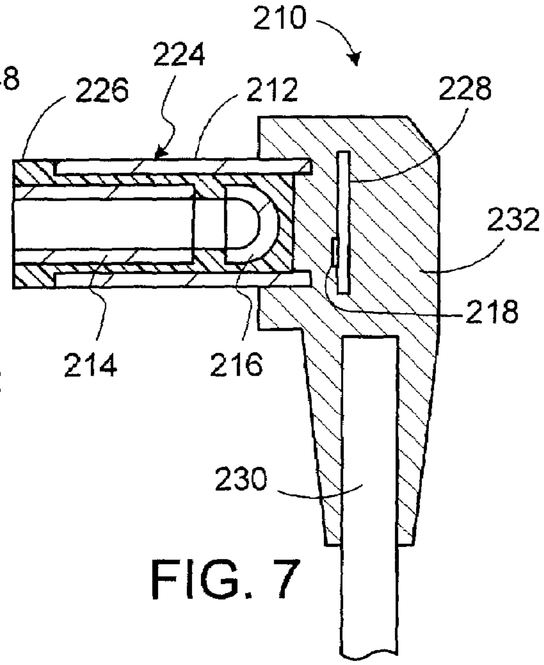
FIG. 7 is a side, partial section view of an adapter plug in accordance with one embodiment of a present invention.

Turning to FIG. 7, one example of a corresponding adapter plug 210 is provided with a generally hollow (or "female") connector 224 that includes the positive contact 212, ground contact 214 and adapter ID contact 216. In this embodiment, the positive contact 212 is generally cylindrical in shape and forms part of the outer surface of the connector 224, the ground contact 214 is generally cylindrical in shape and forms part of the inner surface of the connector, and the adapter ID contact 216, which has a generally semi-spherical portion and a generally cylindrical portion, forms part of the inner surface of the connector. Such contacts are mechanically configured to mate with the corresponding contacts on the power receptacle 126. The contacts 212, 214, and 216, which are separated by insulating material 226, are individually connected to a circuit board 228 which carries the adapter ID resistor 218. The circuit board 228 also connects the ground contact 214, sensing contact 216 and adapter ID resistor 218 to one another in the manner illustrated in FIG. 3B. The positive and ground wires 220 and 222 (not shown in FIG. 7) extend from the circuit board 228 to the power conversion apparatus 206 by way of a cord 230.

An overmold 232 holds the various elements together in the exemplary embodiment illustrated in FIG. 7 and also provides a gripping surface for the user. The connector 224, cord 230 and overmold 232 are respectively arranged such that the cord and connector are at a right angle to one another. Nevertheless, the present inventions are not limited to any particular connector, cord and overmold arrangement. The arrangement may vary to suit particular needs. As illustrated for example in FIG. 11 (which is discussed in greater detail below), the connector, cord and overmold may also be configured in "in-line" fashion.

Although the present inventions are not limited to any particular materials, the contacts in the exemplary embodiments described above and below are preferably formed from highly conductive materials such as gold, silver and brass with a nickel coating. The housings and overmolds are preferably formed from polyvinylchloride ("PVC"), while the insulation is preferably formed from polybutylene terephthalate ("PBT").

Figure 8:
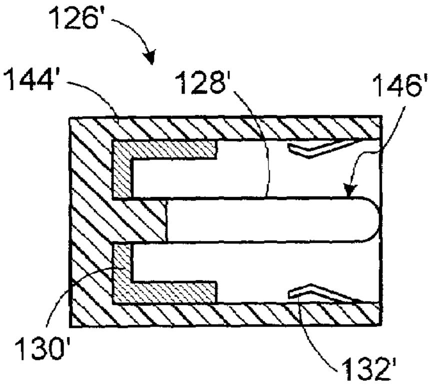
FIG. 8 is a side, partial section view of an electronic device receptacle in accordance with one embodiment of a present invention.
Figure 9:
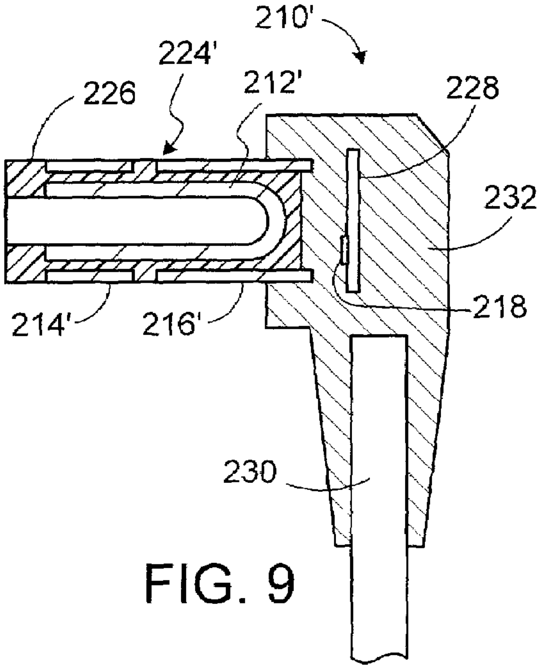
FIG. 9 is a side, partial section view of an adapter plug in accordance with one embodiment of a present invention.

Another exemplary receptacle and plug combination is illustrated in FIGS. 8 and 9. The receptacle and plug illustrated in FIGS. 8 and 9 are functionally similar to the receptacle and plug illustrated in FIGS. 6 and 7 and elements with similar functions are identified by similar reference numerals. The exemplary notebook power receptacle 126' illustrated in FIG. 8 includes a housing 144' and a post-like connector 146', mounted within the housing, that carries a positive contact 128' on its outer surface. In inner surface of the housing 144' includes a ground contact 130' and one or more adapter ID contacts 132'. The adapter ID contacts 132' are preferably, although not necessarily, spring-like contacts that deflect when the adapter plug 210' (FIG. 9) is connected to the notebook power receptacle 126', while the ground contact 130' is generally cylindrical. The positive contact 128', ground contact 130' and adapter ID contact 132' are, as noted above, connected to the appropriate circuitry within the notebook computer 100 by wires (not shown in FIG. 8).

The exemplary corresponding adapter plug 210' illustrated in FIG. 9 is provided with a generally hollow connector 224' that includes a positive contact 212', a ground contact 214' and an adapter ID contact 216'. Here, the positive contact 212' is generally obround in shape (i.e. it has a cylindrical portion and a semi-spherical portion) and forms part of the inner surface of the connector 224', the ground contact 214' is generally cylindrical in shape and forms part of the outer surface of the connector, and the adapter ID contact 216' is generally cylindrical in shape and also forms part of the outer surface of the connector. The size and shape of the positive contact 212' corresponds to that of the positive contact 128' on the notebook power receptacle 126'. The size and space between the ground contacts 214' and adapter ID contact 216' correspond to that of the ground and adapter ID contacts 130' and 132' on the notebook power receptacle 126'. The contacts 212', 214', and 216', which are separated by insulating material 226, are connected by individual wires to the circuit board 228 (and adapter ID resistor 218) and the circuit board is connected to the adapter power conversion apparatus 206 in the manner described above.

Figure 10:
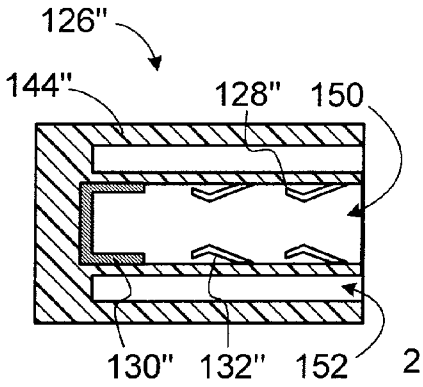
FIG. 10 is a side, partial section view of an electronic device receptacle in accordance with one embodiment of a present invention.
Figure 11:
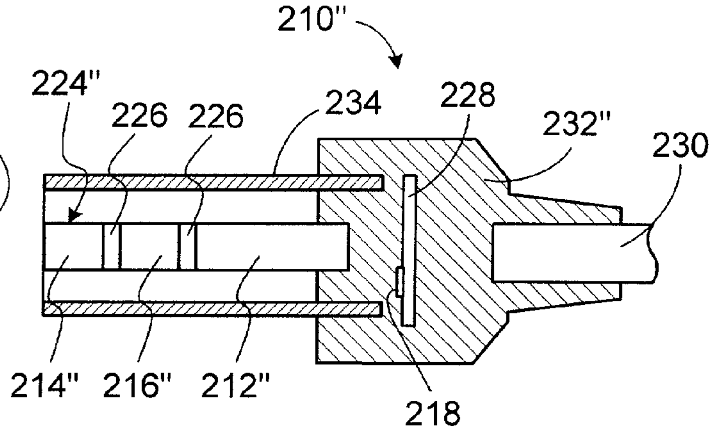
FIG. 11 is a side, partial section view of an adapter plug in accordance with one embodiment of a present invention.

Another exemplary receptacle and plug combination is illustrated in FIGS. 10 and 11. The receptacle and plug illustrated in FIGS. 10 and 11 are functionally similar to the receptacle and plug illustrated in FIGS. 6 and 7 and elements with similar function are identified by similar reference numerals. The exemplary notebook power receptacle 126" illustrated in FIG. 10 is provided with housing 144" with a central opening 150 and a cylindrical slot 152. The inner surface of the central opening 150 includes one or more positive contacts 128", a ground contact 130" and one or more adapter ID contacts 132". The ground and adapter ID contacts 128" and 132" are preferably, although not necessarily, spring-like contacts that deflect when the adapter plug 210" (FIG. 11) is connected to the notebook power receptacle 126", while the ground contact 130" is generally cylindrical. The positive contact 128", ground contact 130" and adapter ID contact 132" are, as noted above, connected to the appropriate circuitry within the notebook computer 100 by wires (not shown in FIG. 10).

The exemplary corresponding adapter plug 210" illustrated in FIG. 11 is provided with a generally post-like connector 224" that includes a positive contact 212", a ground contact 214" and an adapter ID contact 216". Here, the contacts 212", 214", and 216" are all generally cylindrical in shape and all form part of the outer surface of the connector 224". The contacts 212", 214", and 216", which are linearly arranged and separated by insulating material 226, are connected by individual wires (not shown) to the circuit board 228 (and adapter ID resistor 218) and the circuit board is connected to the adapter power conversion apparatus 206 in the manner described above. The size and space between the contacts 212", 214" and 216" corresponds to that of the contacts 128", 130" and 132" on the notebook power receptacle 126". An overmold 232" is configured such that the cord 230 is substantially coaxial with the plugging axis. A protective cylindrical cover 234 for the connector 224", which are received within the slot 152 on the notebook power receptacle 126", is also provided.

In some instances, users may find it necessary to use an adapter having a plug with three contacts (i.e. a positive contact, ground contact and adapter ID contact), such as those described above with reference to FIGS. 1–11, in combination with an electronic device (such as a notebook computer) that does not include a corresponding three-contact power receptacle and corresponding adapter ID capability and, instead, simply includes a conventional positive contact and ground contact arrangement. Here, a conversion device may be provided in order to facilitate the connection of a three-contact adapter plug to a two-contact electronic device power receptacle.

Figure 12:
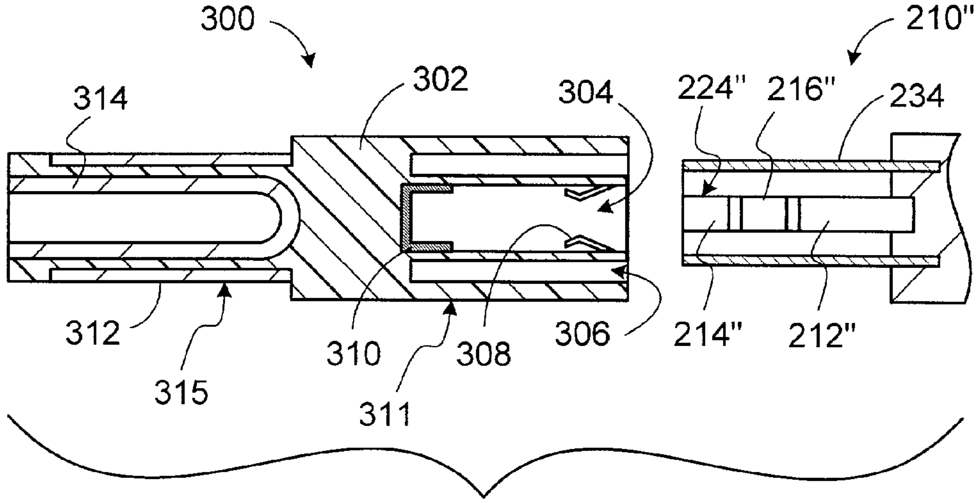
FIG. 12 is a side, partial section view of a conversion device in accordance with one embodiment of a present invention.

One example of a conversion device in accordance with a present invention is generally represented by reference numeral 300 in FIG. 12. Although conversion devices may be configured for use with any three-contact adapter plug, including the adapter plugs illustrated in FIGS. 7 and 9, the exemplary conversion device 300 is configured to mate with the adapter plug 210", which is described above with reference to FIG. 11. The conversion device 300 includes a molded housing 302 with a central opening 304, which is configured to receive the connector 224" of the adapter plug 210", and a cylindrical slot 306, which is configured to receive the cover 234. Adapter-side positive and ground contacts 308 and 310, which together form part of an adapter-side receptacle 311, are positioned within the central opening 304 such that they mate with the positive and ground contacts 212" and 214" on the connector 224". The positive contact 308 is preferably in the form of one or more spring-like contacts. The exemplary conversion device 300 does not, however, include a contact which corresponds to the adapter ID contact 216" on the plug 210". The positive and ground contacts 308 and 310 are electrically connected by, for example, suitable wires (not shown) to electronic device-side positive and ground contacts 312 and 314. The electronic device-side positive and ground contacts 312 and 314 together form part of an electronic device side plug 315. During use, the electronic device-side positive and ground contacts 312 and 314 of the exemplary conversion device 300 would be connected to the positive and ground contacts of an electronic device power receptacle, while the adapter plug 210" positive and ground contacts 212" and 214" would be connected to the adapter-side positive and ground contacts 308 and 310.

It should be noted that, instead of the exemplary unitary structure illustrated in FIG. 12, the conversion device 300 may be composed of a separate adapter-side receptacle and an electronic device-side plug that are connected to one another by a suitable cord.

The present inventions also include power dongles that may be used when an adapter is powering a pair of electronic devices. Although not limited to use with such devices, one exemplary implementation of such a power dongle is described below in the context of a peripheral electronic device that may be used in conjunction with the exemplary notebook computer 100 and adapter 200 in the manner illustrated in FIGS. 13–15. The peripheral device power dongle is configured such that the exemplary notebook computer 100 is able to determine the power requirements of the peripheral device in addition to the power rating of the adapter 200. As a result, the notebook computer 100 can, if necessary, alter its power consumption so that so that the computer and peripheral device does not together attempt to draw more than the adapter's rated level of power.

Figure 13:
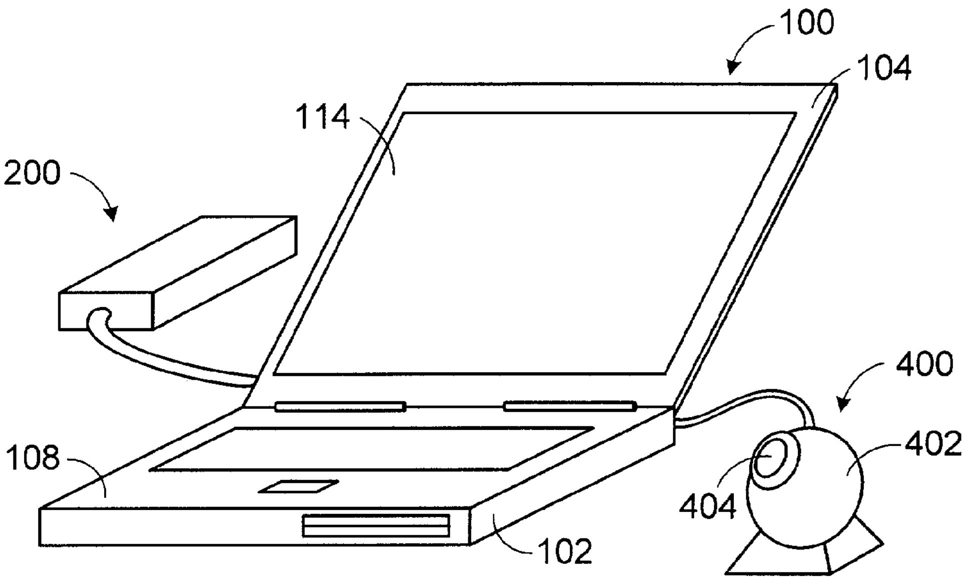
FIG. 13 is a perspective view of an adapter, a notebook computer and a peripheral device in accordance with one embodiment of a present invention.
Figure 14:
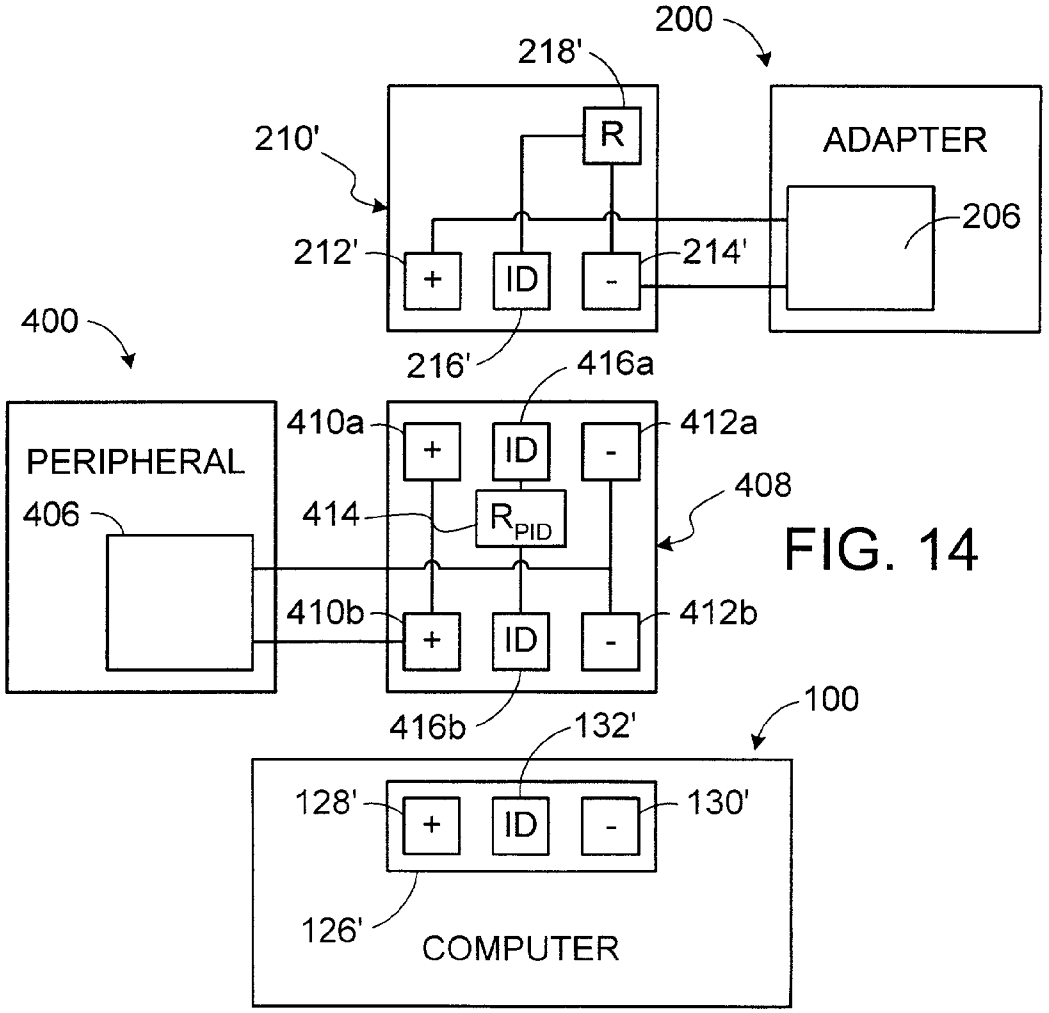
FIG. 14 is a block diagram of the adapter, notebook computer and peripheral device illustrated in FIG. 13.

A digital camera is one example of a peripheral electronic device in accordance with the present inventions. Other exemplary peripheral electronic devices include printers, docking trays, CDRW drives and joy sticks. Referring more specifically to FIGS. 13 and 14, the exemplary digital camera 400 includes a housing 402, a lens 404 and power consuming apparatus 406 (e.g. image processing circuitry). The exemplary digital camera 400 also includes a peripheral device power dongle 408. Although peripheral device power dongles in accordance with the present inventions may be configured for use with any adapter and electronic device, the exemplary dongle 408 is configured for use with the notebook computer 100 and adapter 200. Additionally, although the dongle may be configured for use with any electronic device receptacle and adapter plug, including the receptacles and plugs illustrated in FIGS. 6, 7, 10, and 11, the exemplary dongle 408 is configured to mate with the electronic device receptacle 126' and adapter plug 210' illustrated in FIGS. 8 and 9. More specifically, the dongle 408 includes a pair of positive contacts **410*a*/410*b* and a pair of ground contacts 412*a*/412*b* which are connected positive-to-positive and ground-to-ground, as well as to the power consuming apparatus 406, in the manner illustrated in FIG. 14. The positive contacts 410*a*/410*b* and ground contacts 412*a*/412*b* on the dongle 408 are positioned such that they mate with the corresponding positive contacts 128'/212' and ground contacts 130'/214' on the power receptacle 126' and adapter plug 210'. So arranged, the adapter 200 provides power to both the notebook computer 100 and the digital camera 400**.

The exemplary peripheral device power dongle 408 also includes a peripheral ID resistor 414, which has a resistance $R_{PID}$ that is representative of the peripheral device power requirements, and a pair of ID contacts **416*a*/416*b*. [As noted above, other circuit components or combinations thereof may be employed in place of resistors.] The ID contacts 416*a*/416*b* on the dongle 408 are positioned such that they mate with the corresponding ID contacts 132'/216' on the power receptacle 126' and adapter plug 210' respectively. So arranged, the peripheral ID resistor 414 is in series with the adapter ID resistor 218' when the plug 210' and dongle 408 are connected to one another. The notebook computer 100 (or other electronic device) reads the combined resistance $R_{ID}+R_{PID}$ and respond by, if necessary, drawing less power than it would have absent the presence of the peripheral device. Assuming for example that the digital camera 400 (or other peripheral electronic device) required up to 15 watts, a suitable resistance $R_{PID}$ value would be 10 kΩ when the exemplary resistance $R_{ID}$ values outlined above (i.e. 10 kΩ=90 watt adapter, 20 kΩ=75 watt adapter, and 30 kΩ=60 watt adapter) are employed. When the digital cameral 400 is connected to the computer 100 and an adapter 200 that is rated 90 watts (resistance $R_{ID}$=10 kΩ), the computer reads a resistance of 20 kΩ ($R_{ID}+R_{PID}$), which corresponds to an adapter rating of 75 watts. The computer 100 then limits its power consumption to 75 watts, thereby freeing up watts of adapter capacity for the digital camera 400 and insuring that the computer 100 and digital camera 400** do not together attempt to draw more than the adapter's rated level of power.

Figure 15:
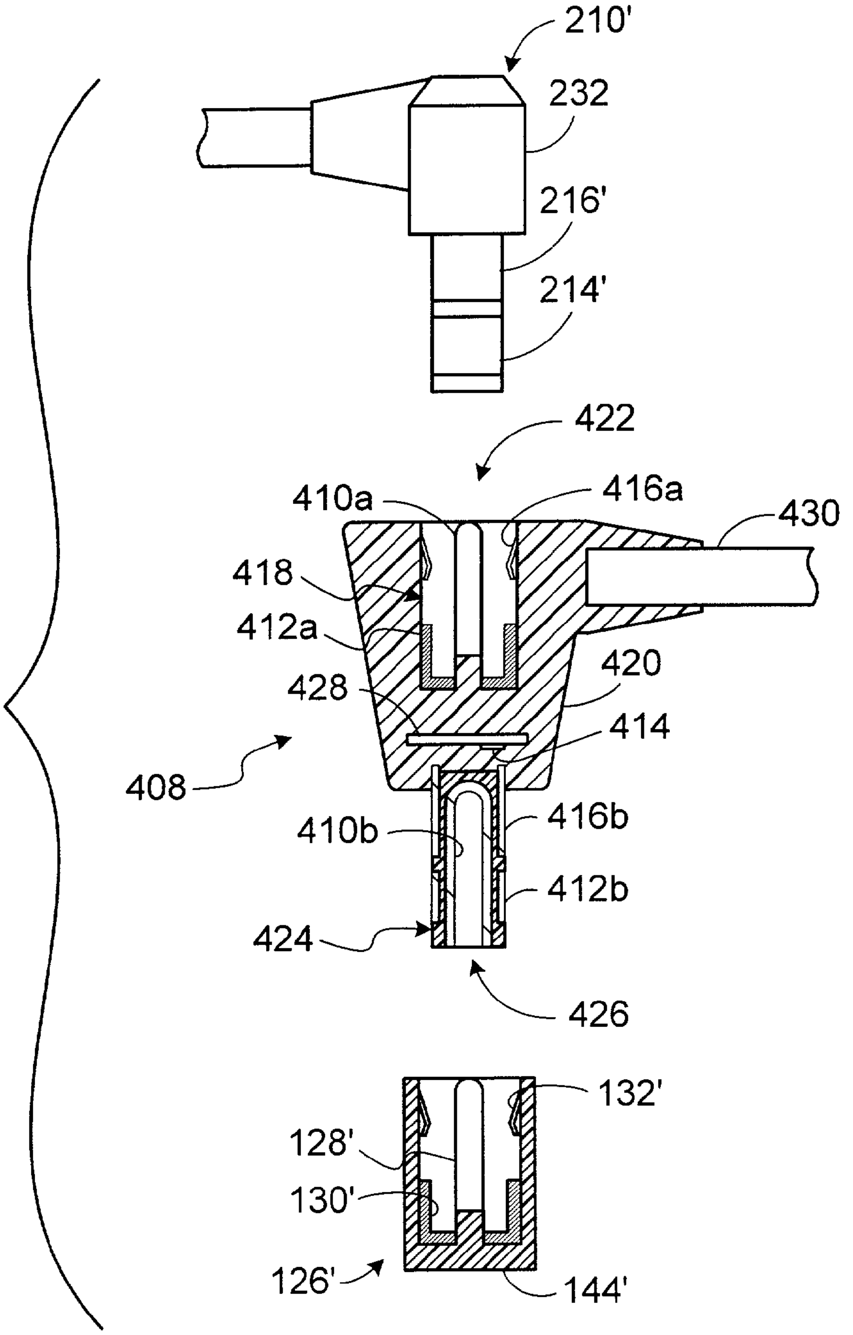
FIG. 15 is a side view of an adapter plug and side, partial section views of a notebook computer power receptacle and a peripheral device dongle in accordance with one embodiment of a present invention.

With respect to physical structure, the peripheral device power dongle 408 may be configured in any fashion that is suitable for its intended use. One exemplary configuration, which may be employed in combination with the exemplary notebook computer power receptacle 126' and adapter plug 210' illustrated FIGS. 8 and 9, is illustrated in FIG. 15. Here, the positive contact 410*a*, ground contact 412*a* and ID contact 416*a* are positioned within an opening 418 in an overmold 420, thereby forming an adapter-side power receptacle 422 that mates with the adapter plug 210'. The positive contact 410*b*, ground contact 412*b* and ID contact 416*b* are mounted on a connector 424, thereby forming a device-side power plug 426 that mates with the electronic device receptacle 126'. The peripheral ID resistor 414 is mounted on a circuit board 428. The positive contacts 410*a*/410*b*, ground contacts 412*a*/412*b*, peripheral ID resistor 414 and ID contacts 416*a*/416*b* are connected in the manner illustrated in FIG. 14 by the circuit board 428 and wiring (not shown in FIG. 15). Positive and ground wires (not shown in FIG. 15) extend from the circuit board 428 to the power consuming apparatus 406 (not shown) by way of a cord 430.

Figure 16:
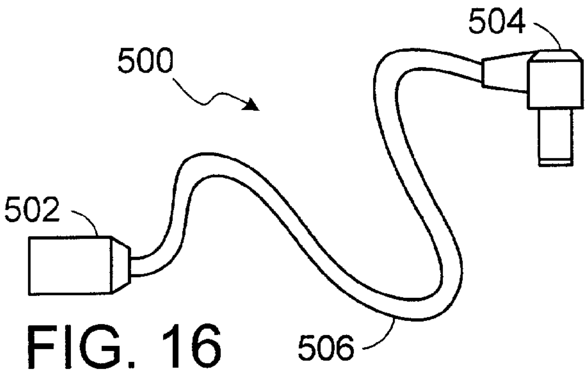
FIG. 16 is a plan view of a dongle in accordance with a preferred embodiment of a present invention.
Figure 17:
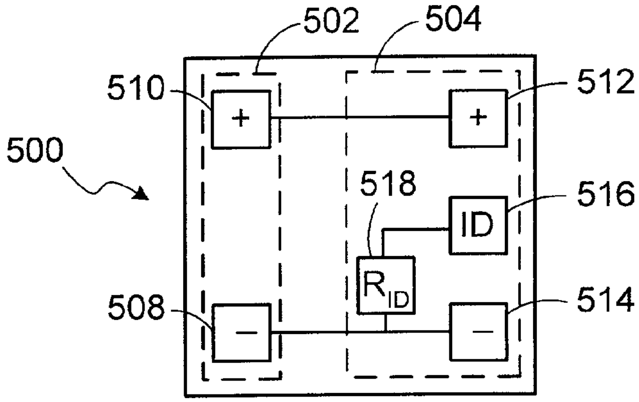
FIG. 17 is a block diagram of the dongle illustrated in FIG. 16.

The present inventions also include power dongles that may be used when a conventional two-contact adapter without an ID resistor and contact arrangement is powering an electronic device (such as the exemplary notebook computer 100) that is configured to measure a resistance that is indicative of adapter power rating. Such a power dongle includes a two-contact power receptacle that may be connected to the adapter and a three-contact power plug, which is provided with an ID resistor, that may be connected to the electronic device. One example of this type of dongle is generally represented by reference numeral 500 in FIGS. 16 and 17. The exemplary dongle 500 includes an adapter-side power receptacle 502, a device-side power plug 504, and a cord 506 that connects the two. The exemplary adapter-side power receptacle 502 includes a positive contact 508 and a ground contact 510, which are configured to mate with the corresponding positive and ground contacts on a conventional adapter plug. The exemplary device-side power plug 504 includes a positive contact 512, a ground contact 514 and an adapter ID contact 516, which are configured to mate with the corresponding positive, ground and adapter ID contacts the an electronic device power receptacle. A dongle ID resistor 518 is also provided. [As noted above, other circuit components or combinations thereof may be employed in place of resistors.] The plugs 502 and 504 are connected to one another positive-to-positive and ground-to-ground.

Once the adapter, exemplary power dongle 500 and electronic device are connected to one another, the electronic device measures the resistance of the dongle ID resistor 518 ("$R_{DID}$") and respond, in the manner described above, just as if it had measured the resistance of a resistor associated with an adapter. The resistance of the dongle ID resistor 518 may be displayed on the dongle so that the dongle may be readily paired with an appropriate adapter by the user. Alternatively, in those instances where the dongle is to be distributed with an electronic device, the resistance of the dongle ID resistor 518 may be chosen such that it corresponds to a "safe" adapter power rating in order to insure that the demands of the electronic device do not exceed the rating of the adapter selected by the user. In the notebook computer context, for example, a resistance $R_{DID}$ value that corresponds to a 60 watt adapter (30 kΩ using the exemplary values described above) would be appropriate because most of the notebook adapters that are currently in service are at least 60 watts.

Figure 18:
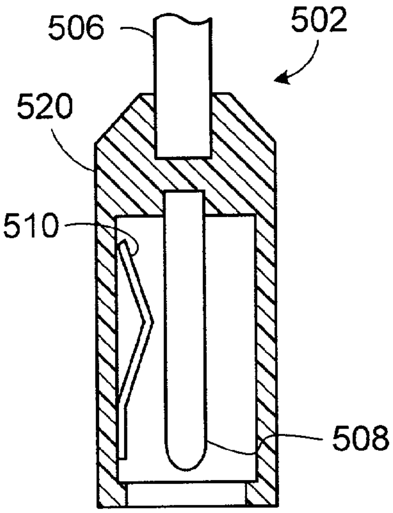
FIG. 18 is a side, partial section view of a dongle receptacle in accordance with one embodiment of a present invention.
Figure 19:
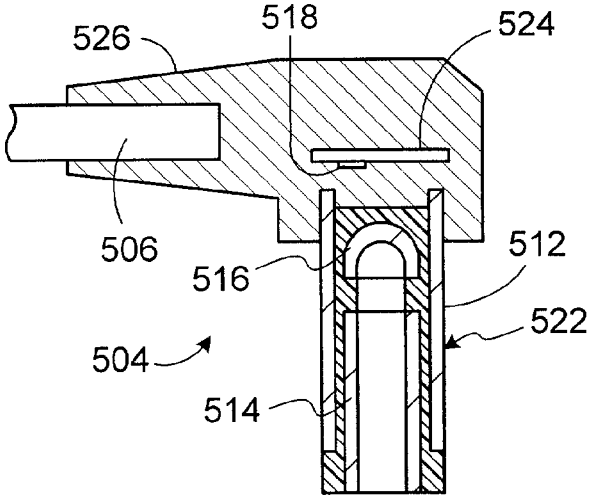
FIG. 19 is a side, partial section view of a dongle plug in accordance with one embodiment of a present invention.

With respect to physical structure, the dongle receptacle 502 and plug 504 may be configured in any fashion that is suitable for their intended use. Exemplary configurations, which may be employed in combination with a conventional adapter and the exemplary notebook computer power receptacle 126 illustrated FIG. 6, are illustrated in FIGS. 18 and 19. Referring first to FIG. 18, the positive and ground contacts 508 and 510 in the exemplary adapter-side power receptacle 502 are mounted within an overmold 520. The positive contact 508 is a post-like (or "male") connector and the ground contact 510 is preferably, although not necessarily, a spring-like contact that deflects when the adapter-side power receptacle 502 is connected to an adapter plug. The exemplary device-side power plug 504 illustrated in FIG. 19 is essentially identical to the adapter plug 210 illustrated in FIG. 7. For example, the positive contact 512, ground contact 514 and adapter ID contact 516 are mounted on a connector 522, the dongle ID resistor 518 is carried by a circuit board 524, and the elements are held together by an overmold 526.

It should be noted that, although the exemplary power dongle 500 includes a receptacle and a plug that are connected to one another by a cord, power dongles in accordance with the present invention may be configured as unitary structures similar to that illustrated in FIG. 12.

Although the present inventions have been described in terms of the preferred embodiments above, numerous modifications and/or additions to the above-described preferred embodiments would be readily apparent to one skilled in the art.

By way of example, but not limitation, the adapter ID resistors (or other circuit components), peripheral device ID resistors (or other circuit components), and/or dongle ID resistors (or other circuit components) described above can be located in areas other than a plug. For example, the adapter ID resistors (or other circuit components) could be located within the housing and connected to the appropriate contacts by wires that extend therefrom.

Additionally, with respect to the conversion devices and dongles described above, the receptacle and plug on any conversion devices or dongle may both be male, may both be female, or may be one male/one female, as may be required for particular applications.

It is intended that the scope of the present inventions extend to all such modifications and/or additions.

We claim:

1. An adapter, comprising:

a power conversion apparatus including a housing, an input and an output;

an adapter plug, wired directly to the power conversion apparatus output, including a positive contact, a ground contact and an ID contact; and at least one circuit component, located within the housing or the adapter plug, and connected to the ID contact and to one of the positive contact and the ground contact.

2. An adapter as claimed in claim 1, wherein the at least one circuit component is carried by the adapter plug.

3. An adapter as claimed in claim 1, wherein the at least one circuit component is connected to the ID contact and the ground contact.

4. An adapter as claimed in claim 1, wherein the at least two contacts are carried by a male connector.

5. An adapter as claimed in claim 1, wherein the at least two contacts are carried by a female connector.

6. An adapter as claimed in claim 1, wherein the at least one circuit component comprises a resistor.

7. An electronic device, comprising:

an apparatus that consumes power;

a power receptacle, operably connected to the apparatus that consumes power, including a positive contact, a ground contact and an ID contact; and a power control system, operably connected to the ID contact and one of the positive contact and the ground contacts, that measures a circuit component value between the ID contact and one of the positive contact and the ground contact.

8. An electronic device as claimed in claim 7, wherein the power control system reduces power consumption of the apparatus that consumes power in response to a measurement of a predetermined circuit component value.

9. An electronic device as claimed in claim 7, wherein the power control system measures a circuit component value between the ID contact and the ground contact.

10. An electronic device as claimed in claim 7, wherein the at least two contacts are carried by a male connector.

11. An electronic device as claimed in claim 7, wherein the at least two contacts are carried by a female connector.

12. An electronic device as claimed in claim 7, wherein the circuit component value comprises resistance.

13. A method of operating an electronic device that is connected to a power adapter that includes an integral adapter plug, the method comprising the steps of:

measuring a circuit component value of a circuit component located in the adapter plug; and reducing power consumption in response to a measurement of a predetermined circuit component value.

14. A method as claimed in claim 13, wherein the adapter plug includes a positive contact, a ground contact and an ID contact and the step of measuring a circuit component value comprises measuring a circuit component value between the ID contact and one of the positive contact and the ground contact.

15. A method as claimed in claim 13, wherein the step of reducing power consumption in response to a measurement of a predetermined circuit component value comprises altering at least one of a CPU operation, a battery charging function, a disk drive operation and display operation in response to a measurement of a predetermined circuit component value.

16. A method as claimed in claim 13, wherein the circuit component value comprises resistance.

17. A system, comprising:

an adapter including a power conversion apparatus having a housing, an input and an output, an adapter plug wired directly to the power conversion apparatus output and having a positive contact, a ground contact and an ID contact, and at least one circuit component located within one of the housing and the adapter plug and connected to the ID contact and to one of the positive contact and the ground contact; and an electronic device including a power receptacle having a positive contact, a ground contact and an ID contact and a power control system that measures the circuit component value of the at least one circuit component between the ID contact and one of the positive contact and the ground contact.

18. A system as claimed in claim 17, wherein the at least one circuit component is carried by the adapter plug.

19. A system as claimed in claim 17, wherein the power control system reduces electronic device power consumption in response to a measurement of a predetermined circuit component value.

20. A system as claimed in claim 17, wherein the at least one circuit component comprises a resistor.

21. A conversion device for use with an electronic device including a power receptacle with positive and ground contacts arranged in predetermined relation to one another and an adapter including an adapter plug with positive, ground and ID contacts arranged in predetermined relation to one another, the conversion device comprising:

an electronic device-side plug including positive and ground contacts arranged such that they mate with the power receptacle positive and ground contacts when the electronic device-side plug is connected to the power receptacle; and an adapter-side receptacle including positive and ground contacts arranged such that they mate with the adapter plug positive and ground contacts, and are in spaced relation to the adapter plug ID contact, when the adapter-side receptacle is connected to the adapter plug.

22. A conversion device as claimed in claim 21, wherein the electronic device-side plug positive contact is electrically connected to the adapter-side receptacle positive contact and the electronic device-side plug ground contact is electrically connected to the adapter-side receptacle ground contact.

23. A conversion device as claimed in claim 21, wherein the electronic device-side plug positive and ground contacts and the adapter-side receptacle positive and ground contacts are mounted in a single molded housing.

24. A conversion device as claimed in claim 21, wherein the adapter-side receptacle comprises a female plug.

25. A conversion device as claimed in claim 21, wherein the electronic device-side plug comprises a female plug.

26. A conversion device as claimed in claim 21, wherein the adapter-side receptacle does not include an ID contact.

27. A power dongle, comprising:

an electronic device-side plug including positive, ground and ID contacts;

an adapter-side receptacle including positive, ground and ID contacts respectively electrically connected to the electronic device-side plug positive, ground and ID contacts; and at least one circuit component connected to the electronic device-side plug ID contact and to the adapter-side receptacle ID contact.

28. A power dongle as claimed in claim 27, further comprising:

a power cord including a positive line electrically connected to at least one of the positive contacts and a ground line electrically connected to at least one of the ground contacts.

29. A power dongle as claimed in claim 27, wherein the electronic device-side plug positive, ground and ID contacts and the adapter-side receptacle positive, ground and ID contacts are mounted in a single molded housing.

30. A power dongle as claimed in claim 27, wherein the adapter-side receptacle comprises a male plug.

31. A power dongle as claimed in claim 27, wherein the electronic device-side plug comprises a female plug.

32. A power dongle as claimed in claim 27, wherein the at least one circuit component comprises a resistor.

33. A power dongle as claimed in claim 27, wherein the adapter-side receptacle positive, ground and ID contacts are respectively electrically connected to the electronic device-side plug positive, ground and ID contacts such that adapter-side receptacle can receive an adapter plug.

34. An electronic device, comprising:

an apparatus that consumes power; and a power dongle, operably connected to the apparatus that consumes power, including an electronic device-side plug having positive, ground and ID contacts, an adapter-side receptacle having positive, ground and ID contacts respectively electrically connected to the electronic device-side plug positive, ground and ID contacts, and at least one circuit component connected to the electronic device-side plug ID contact and to the adapter-side receptacle ID contact.

35. An electronic device as claimed in claim 34, further comprising:

a power cord including a positive line electrically connected to at least one of the positive contacts and a ground line electrically connected to at least one of the ground contacts.

36. An electronic device as claimed in claim 34, wherein the apparatus that consumes power comprises image processing circuitry.

37. An electronic device as claimed in claim 34, wherein the electronic device-side plug positive, ground and ID contacts and the adapter-side receptacle positive, ground and ID contacts are mounted in a single molded housing.

38. An electronic device as claimed in claim 34, wherein the adapter-side receptacle comprises a male plug.

39. An electronic device as claimed in claim 34, wherein the electronic device-side plug comprises a female plug.

40. An electronic device as claimed in claim 34, wherein the at least one circuit component comprises a resistor.

41. An electronic device as claimed in claim 34, wherein the adapter-side receptacle positive, ground and ID contacts are respectively electrically connected to the electronic device-side plug positive, ground and ID contacts such that adapter-side receptacle can receive an adapter plug.

42. A system, comprising:

an adapter including a power conversion apparatus having an input and an output, an adapter plug associated with the power conversion apparatus output and having at least two contacts, and at least one circuit component connected to the at least two contacts;

a first electronic device including a power receptacle having at least two contacts; and a second electronic device including a power dongle with an electronic device-side plug having at least two contacts configured to mate with the first electronic device power receptacle, an adapter-side receptacle having at least two contacts configured to mate with the adapter plug, and at least one circuit component connected to one of the contacts on the electronic device-side plug and one of the contacts on the adapter-side receptacle.

43. A system as claimed in claim 42, wherein the adapter plug includes positive, ground and ID contacts;

the first electronic device power receptacle includes positive, ground and ID contacts;

the dongle electronic device-side plug includes positive, ground and ID contacts; and the dongle adapter-side receptacle includes positive, ground and ID contacts respectively electrically connected to the electronic device-side plug positive, ground and ID contacts.

44. A system as claimed in claim 43, wherein the at least one adapter circuit component is connected to the ID contact and one of the positive contact and the ground contact on the adapter plug; and the at least one power dongle circuit component is connected to the adapter-side receptacle ID contact and the electronic device-side plug ID contact.

45. A system as claimed in claim 42, wherein the first electronic device includes a power control system that measures the circuit component value of the at least one adapter circuit component and the dongle circuit component.

46. A system as claimed in claim 42, wherein the at least one adapter circuit component is carried by the adapter plug.

47. A system as claimed in claim 42, wherein the at least one adapter circuit component comprises a resistor.

48. A system as claimed in claim 42, wherein the at least one power dongle circuit component comprises a resistor.

49. A power dongle, comprising:

an adapter-side receptacle including at least two contacts;

an electronic device-side plug including at least two contacts respectively electrically connected to the at least two contacts on the adapter-side receptacle such that adapter-side receptacle can receive an adapter plug; and at least one circuit component connected to the at least two contacts on the electronic device-side plug.

50. A power dongle as claimed in claim 49, wherein the at least one circuit component is carried by the electronic device-side plug.

51. A power dongle as claimed in claim 49, wherein the at least two contacts on the adapter-side receptacle comprise positive and ground contacts, the at least two contacts on the electronic device-side plug comprise positive, ground and ID contacts, and the at least one circuit component is connected to the electronic device-side plug ID contact and to one of the electronic device-side plug positive and ground contacts.

52. A power dongle as claimed in claim 49, wherein the adapter-side receptacle is connected to the electronic device-side plug by a cord.

53. A power dongle as claimed in claim 49, wherein at least one of the adapter-side receptacle contacts is carried by a male connector.

54. A power dongle as claimed in claim 49, wherein at least one of the electronic device-side plug contacts is carried by a female connector.

55. A power dongle as claimed in claim 49, wherein the at least one circuit component comprises a resistor.

56. A system, comprising:

a power dongle including an adapter-side receptacle having at least two contacts, an electronic device-side plug having at least two contacts respectively electrically connected to the at least two contacts on the adapter-side receptacle such that adapter-side receptacle can receive an adapter plug, and at least one circuit component connected to the at least two contacts on the electronic device-side plug; and an electronic device including a power receptacle having at least two contacts and a power control system that measures the circuit component value of the at least one circuit component.

57. A system as claimed in claim 56, wherein the at least one circuit component is carried by the electronic device-side plug.

58. A system as claimed in claim 56, wherein the at least two electronic device-side plug contacts comprise a positive contact, a ground contact and an ID contact and the at least one circuit component is connected to the ID contact and one of the positive contact and the ground contact.

59. A system as claimed in claim 56, wherein the power control system reduces electronic device power consumption in response to a measurement of a predetermined circuit component value.

60. A system as claimed in claim 56, further comprising: an adapter including an adapter plug having two contacts.

61. A system as claimed in claim 56, wherein the at least one circuit component comprises a resistor.

62. A method of operating an electronic device that is connected to a power dongle, the method comprising the steps of:

measuring a circuit component value associated with the power dongle; and reducing power consumption in response to a measurement of a predetermined circuit component value.

63. A method as claimed in claim 62, wherein the power dongle includes an electronic device-side plug and the step of measuring a circuit component value associated with the power dongle comprises measuring a circuit component value associated with the electronic device-side plug.

64. A method as claimed in claim 63, wherein the electronic device-side plug includes a positive contact, a ground contact and an ID contact and the step of measuring a circuit component value associated with the electronic device-side plug comprises measuring a circuit component value between the ID contact and one of the positive contact and the ground contact.

65. A method as claimed in claim 62, wherein the step of reducing power consumption in response to a measurement of a predetermined circuit component value comprises altering at least one of a CPU operation, a battery charging function, a disk drive operation and display operation in response to a measurement of a predetermined circuit component value.

66. A method as claimed in claim 62, wherein the circuit component value comprises resistance.

* * * * *

UNITED STATES PATENT AND TRADEMARK OFFICE

CERTIFICATE OF CORRECTION

PATENT NO. : 7,028,202 B2
APPLICATION NO. : 10/202136
DATED : April 11, 2006
INVENTOR(S) : Michael D Long et al.

It is certified that error appears in the above-identified patent and that said Letters Patent is hereby corrected as shown below:

In column 9, line 18, after "freeing up" insert -- 15 --.

Signed and Sealed this

Nineteenth Day of May, 2009

JOHN DOLL
*Acting Director of the United States Patent and Trademark Office*